United States Patent [19]

Westendorf et al.

[11] Patent Number: 5,143,190
[45] Date of Patent: Sep. 1, 1992

[54] FRICTION CLUTCH UNIT AND METHOD OF PRODUCING IT

[75] Inventors: Holger Westendorf, Dittelbrunn; Andreas Krause, Schonungen; Friedrich Kittel, Schweinfurt, all of Fed. Rep. of Germany

[73] Assignee: Fichtel & Sachs AG, Schweinfurt, Fed. Rep. of Germany

[21] Appl. No.: 735,053

[22] Filed: Jul. 24, 1991

Related U.S. Application Data

[62] Division of Ser. No. 695,618, May 3, 1991.

[30] Foreign Application Priority Data

May 7, 1990 [DE] Fed. Rep. of Germany ....... 4014470

[51] Int. Cl.⁵ .............................................. F16D 13/50
[52] U.S. Cl. ................................ 192/70.27; 192/70.11
[58] Field of Search ................ 192/70.27, 70.11, 70.28

[56] References Cited

U.S. PATENT DOCUMENTS

| | | | |
|---|---|---|---|
| 4,427,101 | 1/1984 | Maucher et al. | 192/70.27 X |
| 4,560,055 | 12/1985 | Billet | 192/70.28 X |
| 4,593,803 | 6/1986 | Valier | 192/70.27 X |
| 4,641,736 | 2/1987 | Förster | 192/70.27 X |
| 4,662,497 | 5/1987 | Cucinotta et al. | 192/70.28 |
| 4,811,826 | 3/1989 | Kittel et al. | 192/70.27 X |

FOREIGN PATENT DOCUMENTS

| | | |
|---|---|---|
| 3343506 | 12/1983 | Fed. Rep. of Germany . |
| 3802955 | 9/1988 | Fed. Rep. of Germany ... 192/70.27 |
| 2150652 | 12/1983 | United Kingdom . |

Primary Examiner—Rodney H. Bonck
Assistant Examiner—Andrea Pitts
Attorney, Agent, or Firm—Anderson, Kill, Oshinsky

[57] ABSTRACT

The invention relates to an apparatus of and a method of assembling a friction clutch structural unit wherein the clutch housing is centered with a cylindrical portion on a cylindrical guide of the flywheel and the axially correct position is found by axial application and measurement of the initial tension of the clutch main spring and the clutch housing and flywheel are rigidly connected to one another in this state.

19 Claims, 3 Drawing Sheets

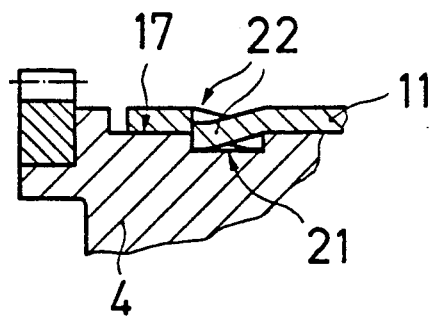
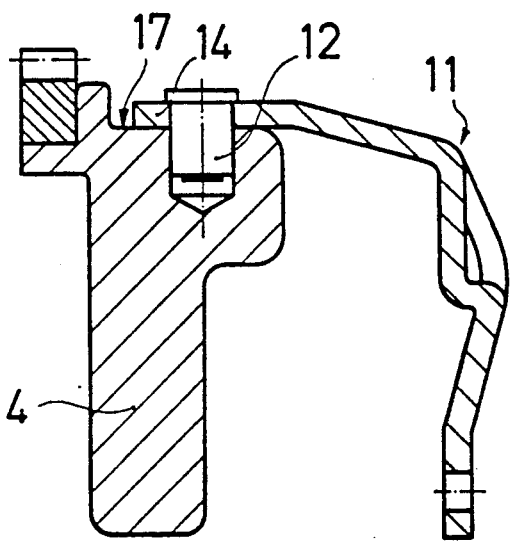
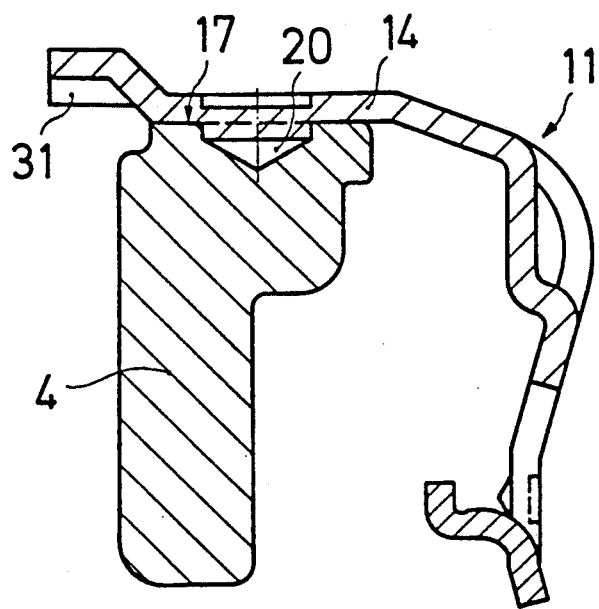

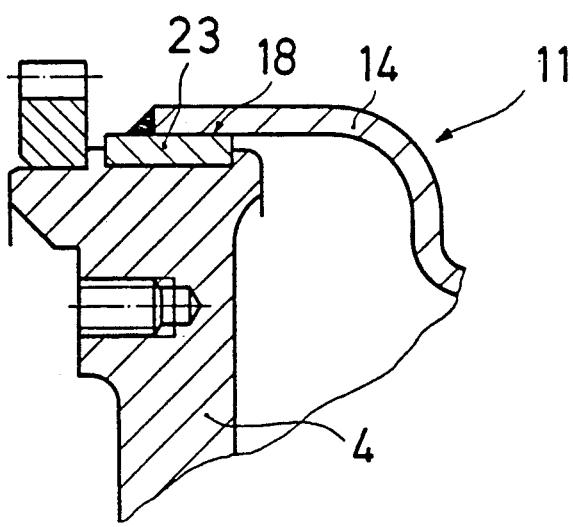
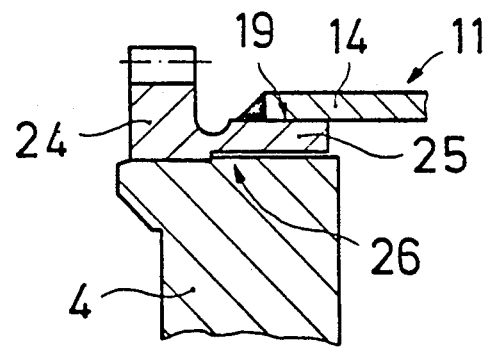
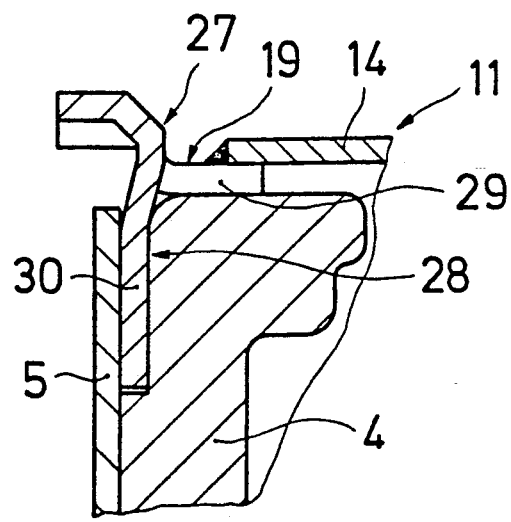

FRICTION CLUTCH UNIT AND METHOD OF PRODUCING IT

This is a division of application Ser. No. 07/695,618, filed May 3, 1991.

BACKGROUND OF THE INVENTION

The invention relates to a friction clutch unit and to a method of producing it.

A friction clutch and a method of assembling it is known from DE-A-3 343 506, in which the complete clutch is preassembled with a flywheel to form a module which can be fastened as a complete unit on the crankshaft of an internal combustion engine, without involving complicated work.

With the known method of assembly, a pressure plate unit consisting of clutch housing, clutch main spring, optionally release elements, pressing plate with non-rotatable but axially movable connection to the clutch housing is firstly assembled and the pressure plate unit is then fastened with interposition of a clutch disc on the flywheel by bending the peripheral wall of the clutch housing round the flywheel. The initial tension of the clutch main spring can be adjusted in limits by setting the bending force.

SUMMARY OF THE INVENTION

The present invention aims at providing a initial tension of the clutch main spring, can be adjusted exactly in the course of assembly, more simply and accurately than hitherto, independently of the tolerances of the individual components.

Owing to the axial movable guidance of the clutch housing with a cylindrical guide face on a cylindrical guide face of the flywheel or a component rigidly connected thereto and owing to the measurement of the axial force as they are pushed together, it is possible to determine the exact position of flywheel and clutch housing with respect to the tension of the clutch main spring and to produce a fastening in this position. As the desired trend of the spring force is known, the initial tension can be determined exactly and can be set to its desired value during assembly.

It is expedient if the cylindrical guide face is formed by an annular face on the flywheel and by a cylindrical portion of the clutch housing which is placed with its internal diameter on the annular face. The annular face can be arranged directly on the external periphery of the flywheel. Such a construction permits, for example, the simple arrangement of blind rivets distributed round the periphery in the flywheel, by means of which the clutch housing is fixed axially and peripherally. However, it is also possible to arrange, in the annular face of the flywheel, outwardly open recesses which are covered by the clutch housing and into which material of the cylindrical portion is deformed at least in part from the exterior by plastic deformation. Such a connection succeeds without further connecting elements. The recesses can be designed in the form of blind holes or also in the form of an at least partially encircling groove.

A particularly simple connection between clutch housing and flywheel is possible if the cylindrical guide face is formed by an internal annular face which is arranged on the flywheel and into which a cylindrical end portion of the clutch housing penetrates at least in part, and the two parts are welded to one another. It is advantageous if the internal annular face as well as the cylindrical end portion are peripherally divided and extend only over individual sectors. A substantially negligible reaction by the welded joint on the attachment of the clutch main spring is achieved in this way.

However, it is also possible to form the annular face by a component placed on the flywheel. This can be provided, for example, in the form of a cast ring. The advantage arises that the material of the ring can be optimally adapted for a welded joint. However, it is also possible to design the gearwheel for the starter such that it can be placed as a gear rim onto the flywheel and points with a projection in the direction of the clutch housing, the external contour of the projection forming the annular face for guiding the cylindrical projection of the clutch housing. An axial stop of the flywheel transmits the tension of the clutch main spring, and the fastening of the starter gearwheel is provided at the same time. A particularly inexpensive design can be achieved if the component is a gearwheel which is shaped from sheet metal and rests with an annular part on a vertical stop face of the flywheel pointing away from the clutch housing, projections which are angled axially from the annular part being placed on the external periphery of the flywheel and the external contour of the projections forming the annular face. An unproblematical welded joint is thus produced between the clutch housing and the starter gearwheel shaped from sheet metal.

The various features of novelty which characterize the invention are pointed out with particularly in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIGS. 2 to 4 are partial longitudinal sections with fastening by plastic deformation and use of blind rivets.

FIGS. 5 to 7 are partial longitudinal sections with fastening by a welded joint.

DESCRIPTION OF PREFERRED EMBODIMENTS

Figure 1:
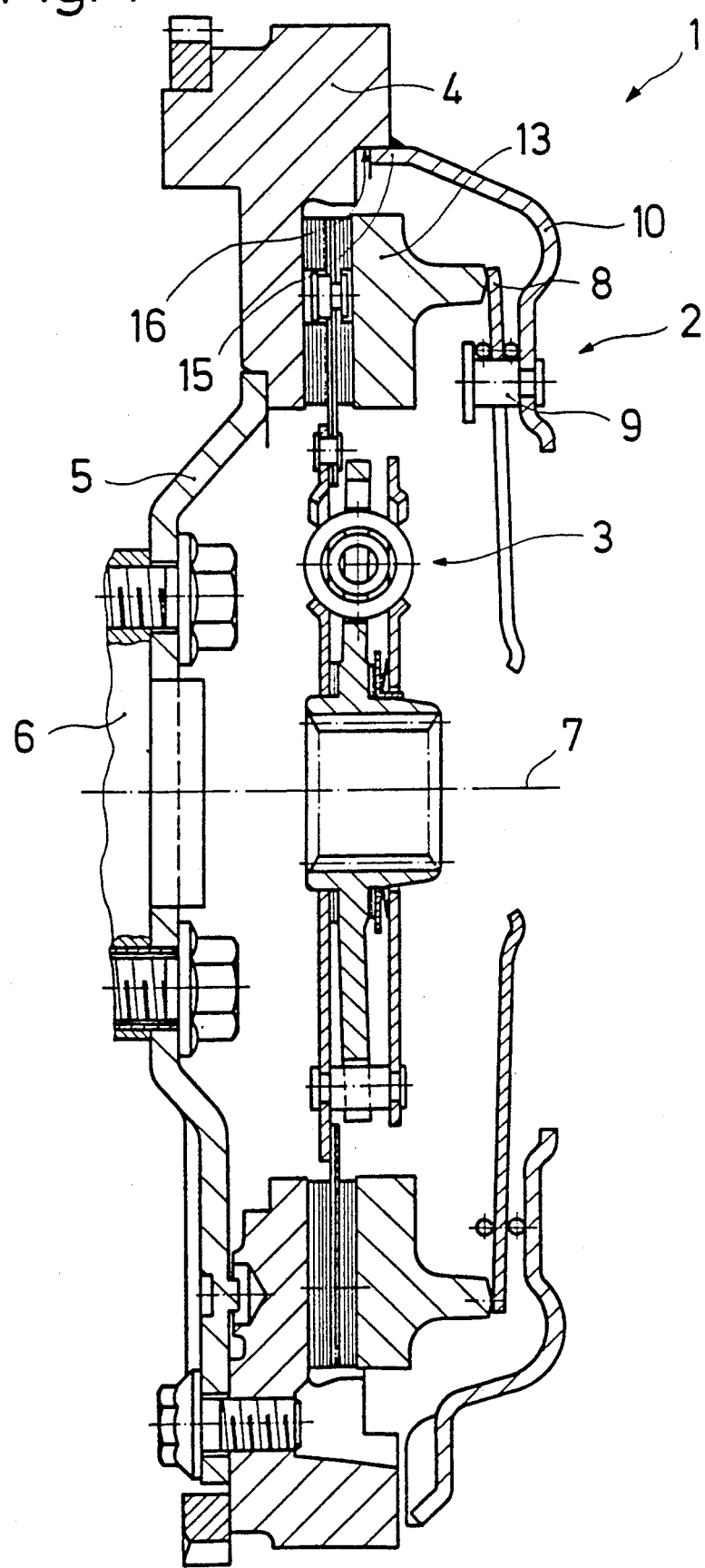
FIG. 1 is an axial longitudinal section through a clutch module.

FIG. 1 shows a friction clutch 1 comprising a pressure plate unit 2 with a clutch housing 10, a pressing plate 13 which is axially movably but non-rotatably fastened on the clutch housing 10, a diaphragm spring 8 which rests on the one hand on the housing 10 and on the other hand on the pressing plate 13, a plurality of spacer pins 9 which are distributed round the periphery and define the sweep circuit of the diaphragm spring 8 being arranged in the housing. It would also be possible directly to use a different spring and release lever at this point. The pressure plate unit is connected, together with a conventional clutch disc 3 which is clamped with its friction linings between a flywheel 4 and the pressing plate 13, to the flywheel 4 and this module is screwed, in the fitted state, on a carrier plate 5 fastened on a crankshaft 6 of the internal combustion engine. The use of a clutch module is advantageous in that it can be preassembled and balanced as a complete unit and then merely has to be screwed on the carrier plate 5. The friction clutch is assembled as follows in the present case: the pressure plate unit 2 is preassembled as a sub-unit and, together with the clutch disc 3, is attached to the flywheel 4. The diaphragm spring 8 is in its relaxed position. The clutch housing 10 is introduced by means of an assembly device with its cylindrical end portion 15 into an internal annular face 16 of the flywheel 4 and is loaded against the axially supported flywheel 4. The diaphragm spring 8 is thus brought into its operating position. During insertion of the clutch housing 10 into the flywheel 4, the force required for this purpose is measured and, as the desired spring tension is known precisely, the connection between clutch housing 10 and flywheel 4 can be made by welding the two parts together once this spring tension is attained. This method of assembly ensures that—independently of tolerances of the individual parts—the diaphragm spring 8 is brought into its exactly correct position and the necessary spring force characteristic can be maintained—based on the new state of the clutch linings. FIG. 1 also shows the common axis of rotation 7, round which the crankshaft 6 as well as the complete friction clutch 1 rotate in operation. It can also be seen that the cylindrical end portion 15 and the internal annular face 16 are not designed in an encircling manner but only in sectors.

FIG. 2 shows details of a longitudinal section through a variation of a fastening region between a clutch housing 11 and the flywheel 4. In the present case, the clutch housing 11 is axially placed with a cylindrical portion 14 onto a correspondingly cylindrical external annular or guide face 17 of the flywheel 4 and is connected in the measured relative position by a plurality of peripherally distributed blind rivets 12. The bores and blind rivets can easily be introduced from radially outside through the clutch housing 11 into the flywheel 4.

According to FIG. 3, there is arranged from the exterior in the flywheel 4 in the annular or guide face 17 an encircling groove 21 into which tabs 22 of the clutch housing 11 are bent by plastic deformation using suitable dies, after connection to the clutch housing 11. A perfect axial connection is produced by alternate arrangement of these tabs 22. A non-rotatable anchorage can be produced if the groove 21 is not arranged in an encircling manner but is peripherally limited so that the tabs 22 can also form the non-rotatable connection.

FIG. 4 shows a variation of FIG. 3 in which there is introduced radially from the exterior in the annular face 17 of the flywheel 4 a plurality of peripherally distributed blind holes 20 into which the material of the cylindrical portion 14 of the clutch housing 11 is deformed at least in part by dies having a circular cross section. This connection is at the same time axially rigid and also non-rotatable. In the illustration, a gearwheel 31 for the starter is simultaneously formed by an extension of the clutch housing 11 beyond the joint.

FIG. 5 shows a welded joint between clutch housing 11 and flywheel 4, a ring 23 being cast in the flywheel 4 and forming, with its external diameter, an annular face 18 onto which the cylindrical portion 14 of the clutch housing 11 is pushed. The arrangement of the ring 23 allows a simpler welded joint as the material composition of the ring 23 is selected with regard to a good welding capacity.

FIG. 6 shows an arrangement in which a gearwheel 27 shaped from sheet metal is placed from the crankshaft side onto the flywheel 4 and is fixed axially by a vertical stop face 28 and also via a plurality of peripherally distributed, axially exposed projections 29 in the radial direction relative to the flywheel 4. The external contour of the axial projections 29 forms a guide face 19 onto which the cylindrical portion 14 of the clutch housing 11 is axially pushed. A welded joint between the clutch housing 11 and the gearwheel 27 formed from sheet metal is also produced here.

FIG. 7 shows a variation of FIG. 6, in which the gearwheel 24 is produced from solid material, is placed on the external periphery of the flywheel 4 and is axially secured by an axial stop 26, an axial projection 25 of the gearwheel 24 forming the guide face 19—for application of the cylindrical portion 14 of the clutch housing 11. A welded joint is also provided here.

While specific embodiments of the invention have been shown and described in detail to illustrate the application of the inventive principles, it will be understood that the invention may be embodied otherwise without departing from such principles.

What we claim is:

1. An apparatus for a friction clutch structural unit which comprises:
   a flywheel which defines an axis of rotation of said friction clutch;
   a clutch housing which is fastened to the flywheel by an attachment means in a defined axial position relative to said flywheel;
   a pressing plate which is guided at the clutch housing so as to be nonrotational and axially mobile;
   a clutch disk and friction lining arrangement located axially between the flywheel and the pressing plate; and
   a clutch main spring arrangement which tensions the pressing plate through the friction lining against the flywheel which arrangement has a predetermined spring force in the axial position of the clutch housing relative to the flywheel defined by said attachment means;
   wherein one of the flywheel and a component rigidly connected thereto, and the clutch housing have guide faces which have a cylindrical contour, at least in sectors;
   wherein the guide faces center the clutch housing relative to the flywheel and which, in the absence of the attachment means, permits a radially centered axial displacement of the clutch housing relative to the flywheel and having a displacement range which permits the adjustment of a predetermined spring force; and further wherein the attachment means retains the clutch housing against one of the flywheel and a component rigidly connected thereto in a region where the guide faces are radially adjacent to one another.

2. The friction clutch unit according to claim 1, wherein the clutch housing has a cylindrical peripheral wall, at least in sectors, and the flywheel has a peripheral wall with a cylindrical internal annular face, at least in sectors, and wherein said peripheral wall of the clutch housing penetrates axially into an internal annular face and is welded on a rim of the internal annular face.

3. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto.

4. The friction clutch unit according to claim 3, wherein blind rivets are inserted radially from an exterior through the peripheral wall of the clutch housing into the flywheel.

5. The friction clutch unit according to claim 3, wherein the cylindrical external face of the flywheel contains radial recesses into which the peripheral wall of the clutch housing is pressed with plastic deformation.

6. The friction clutch unit according to claim 3, wherein the cylindrical external face of the flywheel contains a groove which extends at least over a part of a periphery and into which U-shaped tabs formed on the peripheral wall of the clutch housing are bent.

7. The friction clutch unit according to claim 6, wherein the tabs protrude peripherally alternately in opposite directions from a peripheral wall.

8. The friction clutch unit according to claim 3, wherein the peripheral wall of the clutch housing is welded on one of the flywheel and the component connected rigidly thereto.

9. The friction unit according to claim 8, wherein the peripheral wall of the clutch housing is welded on a ring attached to the flywheel and forms the guide face.

10. The friction clutch unit according to claim 3, wherein the component is formed as a starter gear rim which surrounds the flywheel and is supported on an axial stop shoulder of the flywheel receiving an initial tension of the clutch main spring arrangement, the gear rim having an annular protrusion forming the guide face.

11. The friction clutch unit according to claim 3, wherein the component is designed as a starter gear rim which is shaped from sheet metal and rests with an annular part on a stop face, pointing axially away from the clutch housing, of the flywheel and has axially protruding projections which rest on an external periphery of the flywheel and form the guide face.

12. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto, and further wherein blind rivets are inserted radially from an exterior through the peripheral wall of the clutch housing into the flywheel.

13. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto, and further wherein the cylindrical external face of the flywheel contains radial recesses into which the peripheral wall of the clutch housing is pressed with plastic deformation.

14. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto, and further wherein, the cylindrical external face of the flywheel contains a groove which extends at least over a part of a periphery and into which U-shaped tabs formed on a peripheral wall of the clutch housing are bent.

15. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto, and further wherein, the component is formed as a starter gear rim which surrounds the flywheel and is supported on an axial stop shoulder of the flywheel receiving an initial tension of the clutch main spring arrangement, the gear rim having an annular protrusion forming the guide face.

16. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto, and further wherein, the component is designed as a starter gear rim which is shaped from sheet metal and rests with an annular part on a stop face, pointing axially away from the clutch housing, of the flywheel and has axially protruding projections which rest on an external periphery of the flywheel and form the guide face.

17. The friction clutch unit according to claim 1, wherein the clutch housing has a cylindrical peripheral wall, at least in sectors, and one of the flywheel and the component connected thereto has a cylindrical peripheral wall with a cylindrical external face, at least in sectors, a peripheral wall of the clutch housing resting on the cylindrical external face of one of the flywheel and the component connected thereto, and wherein the peripheral wall of the clutch housing is welded on one of the flywheel and the component connected rigidly thereto, and further wherein, the peripheral wall of the clutch housing is welded on a ring attached to the flywheel and forms the guide face.

18. A friction clutch structural unit which comprises:
   a flywheel defining an axis of rotation;
   a clutch housing fastened on the flywheel by an attachment means;
   a pressing plate non-rotatably but axially movably guided on the clutch housing;
   a clutch disk arranged with its friction linings axially between the flywheel and the pressing plate and;
   a clutch main spring arrangement tensioning the pressing plate via the friction linings against the flywheel, wherein one of a flywheel and a component rigidly connected thereto and the clutch housing have guide faces which have a cylindrical contour, at least in sectors, which center the clutch housing relative to the flywheel and, in the absence of the attachment means, allow the centered axial displacement of the clutch housing relative to the flywheel, and wherein the attachment means hold the clutch housing in the region of the adjacent guide faces on one of the flywheel and the component connected thereto, and further wherein the clutch housing has a cylindrical peripheral wall, at least in sectors, and one of the flywheel and the component connected thereto has a cylindrical peripheral wall with a cylindrical external face, at least in sectors, the peripheral wall of the clutch housing resting on the cylindrical external face of one of the flywheel and the component connected thereto, and further wherein the component is formed as a starter gear rim which surrounds the flywheel and is supported on an axial stop shoulder of the flywheel receiving an initial tension of the clutch main spring arrangement, the gear rim having an annular protrusion forming the guide face.

19. A friction clutch structural unit which comprises:
a flywheel defining an axis of rotation;
a clutch housing fastened on the flywheel by an attachment means;
a pressing plate non-rotatably but axially movably guided on the clutch housing;
a clutch disc arranged with its friction linings axially between the flywheel and the pressing plate and a clutch main spring arrangement tensioning the pressing plate via the friction linings against the flywheel, wherein one of the flywheel and a component rigidly connected thereto and the clutch housing have guide faces which have a cylindrical contour, at least in sectors, and center the clutch housing relative to the flywheel and, in the absence of the attachment means, allow the centered axial displacement of the clutch housing relative to the flywheel, and wherein the attachment means hold the clutch housing in the region of the adjacent guide faces on the flywheel or the component connected thereto, and further, wherein the clutch housing has a cylindrical peripheral wall, at least in sectors, and the flywheel or the component connected thereto has a cylindrical peripheral wall with a cylindrical external face, at least in sectors, the peripheral wall of the clutch housing resting on the cylindrical external face of one of the flywheel and the component connected thereto, and further, wherein the component is designed as starter gear rim which is shaped from sheet metal and rests with an annular part on a stop face, pointing axially away from the clutch housing, of the flywheel and has axially protruding projections which rest on an external periphery of the flywheel and form the guide face.

* * * * *